United States Patent
Malley et al.

(10) Patent No.: US 10,215,236 B2
(45) Date of Patent: Feb. 26, 2019

(54) PROGRESSIVITY DEVICE FOR CLUTCH FRICTION DISK, AND FRICTION DISK COMPRISING SUCH DEVICE

(71) Applicant: VALEO EMBRAYAGES, Amiens (FR)

(72) Inventors: Matthieu Malley, Beauvais (FR); Adrien Nerriere, Amiens (FR)

(73) Assignee: Valeo Embrayages, Amiens (FR)

( * ) Notice: Subject to any disclaimer, the term of this patent is extended or adjusted under 35 U.S.C. 154(b) by 0 days.

(21) Appl. No.: 15/420,525

(22) Filed: Jan. 31, 2017

(65) Prior Publication Data
US 2017/0227066 A1    Aug. 10, 2017

(30) Foreign Application Priority Data

Feb. 5, 2016  (FR) ..................... 16 50933

(51) Int. Cl.
*F16D 13/64* (2006.01)

(52) U.S. Cl.
CPC ........ *F16D 13/64* (2013.01); *F16D 2013/642* (2013.01)

(58) Field of Classification Search
CPC ............................ F16D 13/64; F16D 2013/642
See application file for complete search history.

(56) References Cited

U.S. PATENT DOCUMENTS

| | | | |
|---|---|---|---|
| 3,587,803 A * | 6/1971 | Sugiura et al. | F16D 13/64 192/107 C |
| 4,113,078 A * | 9/1978 | Maycock | F16D 13/64 192/107 C |
| 4,591,040 A | 5/1986 | Schraut et al. | |
| 4,671,399 A * | 6/1987 | Ooga | F16D 13/64 192/107 C |
| 4,697,683 A * | 10/1987 | Graton | F16D 13/64 192/107 C |
| 4,714,148 A | 12/1987 | Alas et al. | |
| 5,413,202 A | 5/1995 | Maucher | |
| 5,857,551 A | 1/1999 | Yoneda | |
| 6,739,442 B2 | 5/2004 | Marchisseau | |

FOREIGN PATENT DOCUMENTS

| | | |
|---|---|---|
| DE | 901479 C | 1/1954 |
| DE | 2111892 A1 | 9/1972 |
| FR | 988326 A | 8/1951 |
| FR | 2352211 A1 | 12/1977 |

(Continued)

*Primary Examiner* — David J Hlavka
(74) *Attorney, Agent, or Firm* — Berenato & White, LLC

(57) ABSTRACT

The invention relates on the one hand to a progressivity device for a clutch friction disk, comprising a progressivity web (1) having a central rotation axis (X), having on one face of its external rim (1*a*) a series of blades (2) on which are configured at least two deformable pleats (20*a*, 20*b*) delimiting a region (20) intended to support a first friction lining (G1) and equipped with a stiffness element, and on the other face a second friction lining (G2) fastened symmetrically to the first lining (G1), wherein the stiffness element comprises at least one tab projecting below the region (20), one end of which is intended to come into abutment against the web (1) upon deformation of the pleats (20*a*, 20*b*), limiting the arching of the region (20); and on the other hand to a friction disk comprising such a device.

21 Claims, 7 Drawing Sheets

(56) References Cited

FOREIGN PATENT DOCUMENTS

| | | |
|---|---|---|
| FR | 2370893 A1 | 6/1978 |
| FR | 2530756 A1 | 1/1984 |
| FR | 2565305 A1 | 12/1985 |
| FR | 2688279 A1 | 9/1993 |
| GB | 1591949 A | 7/1981 |
| WO | WO0240885 A1 | 5/2002 |
| WO | WO2008058500 | 5/2008 |

* cited by examiner

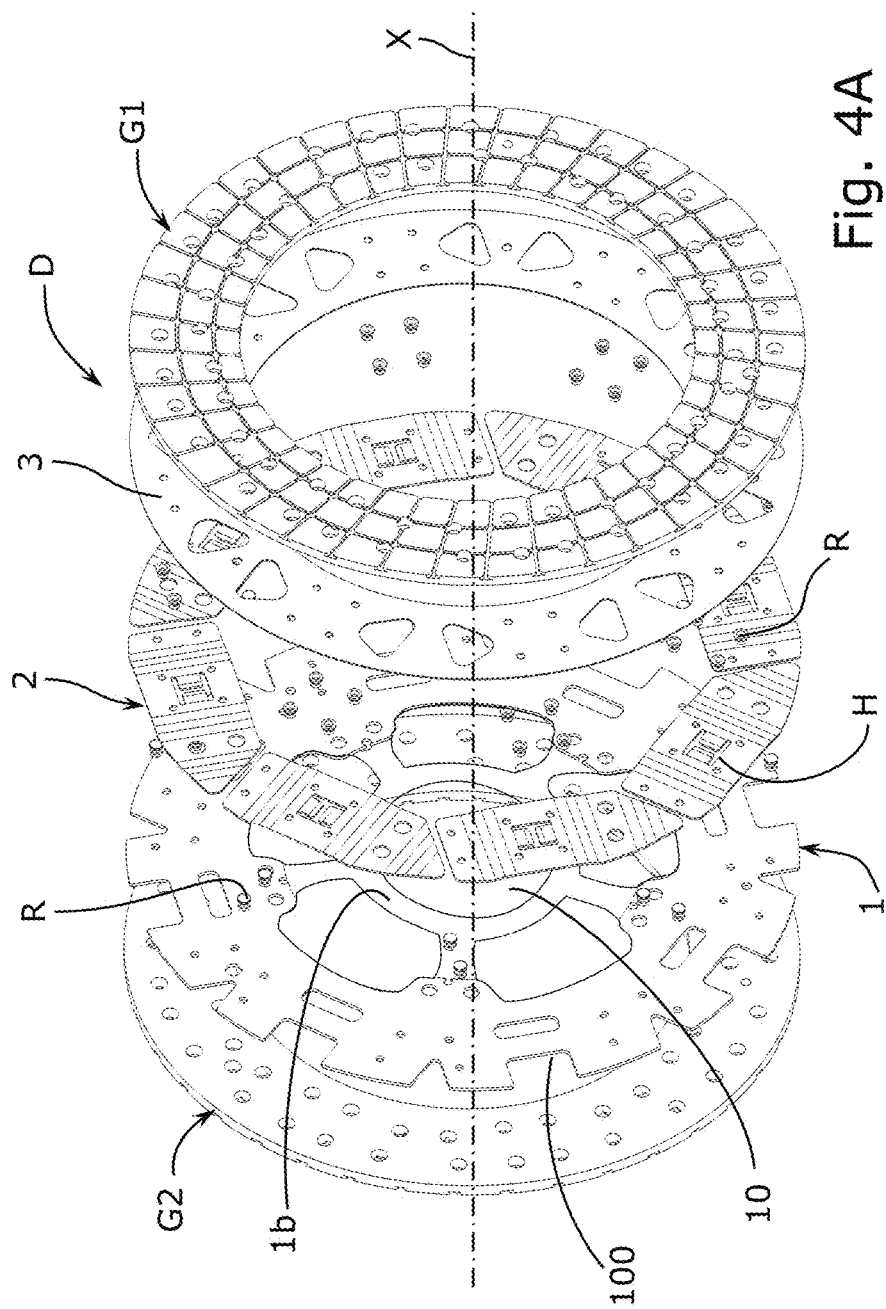

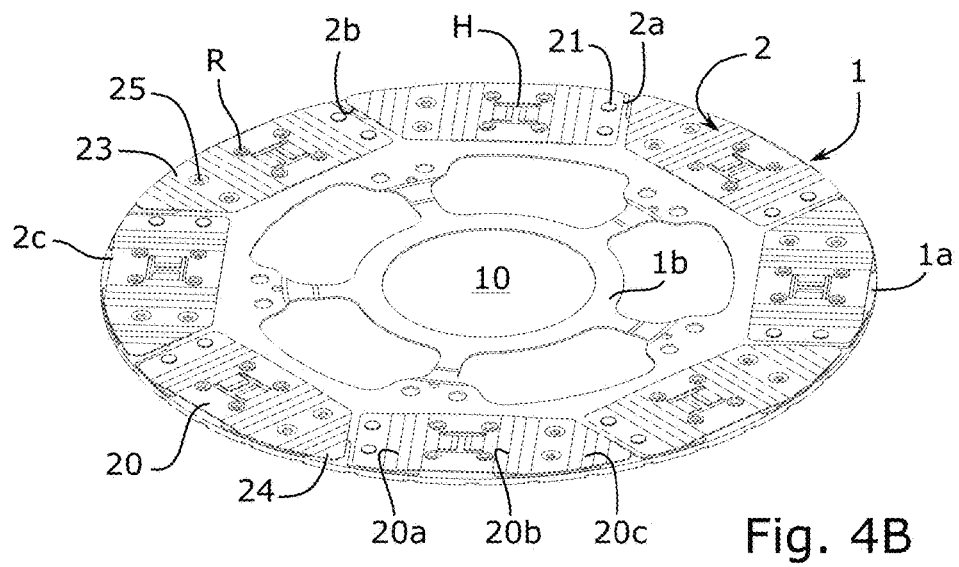
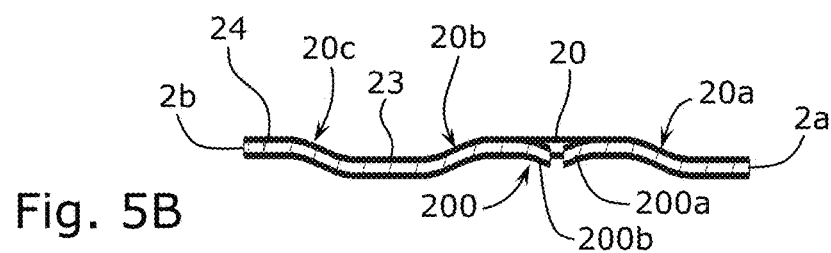
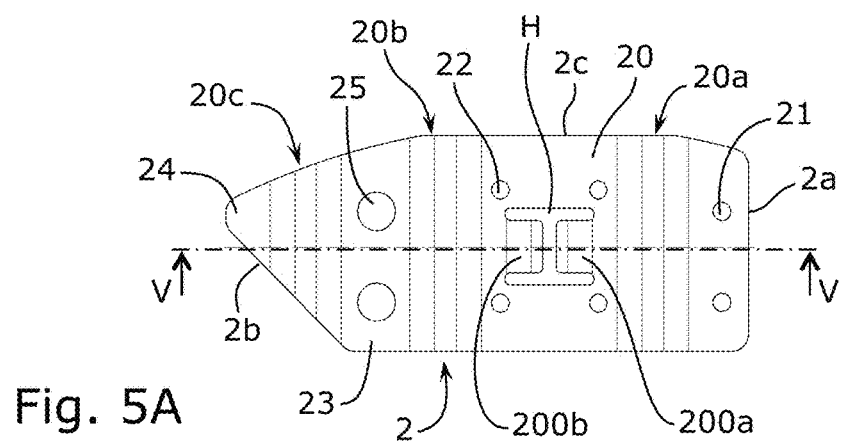

PROGRESSIVITY DEVICE FOR CLUTCH FRICTION DISK, AND FRICTION DISK COMPRISING SUCH DEVICE

CROSS-REFERENCE TO RELATED APPLICATIONS AND CLAIM TO PRIORITY

This application is related to Patent Application No. 1650933 filed Feb. 5, 2016 in France, the disclosure of which is incorporated herein by reference and to which priority is claimed.

FIELD OF THE INVENTION

The invention relates to a progressivity device for a clutch friction disk of a motor vehicle.

The invention relates more specifically to an improvement to clutches of the type comprising a friction disk mounted on the gearbox input shaft and coming into abutment against the engine flywheel in an engaged position. A clutch mechanism fastened on the engine flywheel applies a clamping force onto the friction disk in order to transmit the torque produced by the engine.

BACKGROUND OF THE INVENTION

Friction disks for a clutch traditionally comprise a so-called "progressive" torque input web carrying peripheral friction linings.

Two guide washers arranged on either side of the web are mounted on a central hub integral with the driven shaft of the gearbox, capturing compression springs in intercalated receptacles.

Torque transmission, and filtering of engine irregularities, is accomplished by successive compression and relaxation of the springs.

When the clutch pedal is actuated the clutch mechanism releases the friction linings, causing disconnection of the driving shaft from the driven shaft of the gearbox.

Torque transmission must be as progressive as possible during the re-engagement phase.

This is because during this phase, the linings are heavily loaded and tend to deform in an uncontrolled manner, which then creates discontinuities in torque transmission which are accompanied by a chattering phenomenon, with jolts that are very uncomfortable and prejudicial to driving of the vehicle.

Applied-blade progressivity devices, such as the one described in FR 2 352 211, already exist.

This document discloses a clutch friction disk comprising a progressivity device whose central web carries on its periphery a series of coplanar blades integrated with the web by rivets and intended to support a first friction lining, a second lining being fastened on the opposite face of the central progressivity web.

These blades exhibit at least two pleats of material, delimiting between them the support region of the first lining and mechanically compensating, by compression, for the deformations of that lining in order to keep the two linings in parallel planes.

These pleats extend on either side of the fastening region of the blades on the web, being oriented along intersecting lines that are inclined with respect to its diametrical axis.

This configuration is not always satisfactory, however, since it does not allow effective resolution of the technical problems referred to above.

Specifically, because the rivets that provide connection between the web and the first lining via the blades exert radial traction forces on that lining, and because, during re-engagement, the inclined pleats are subjected to compressive stresses in divergent directions, the resultant of those forces still causes the appearance on that lining of geometric defects such as out-of-parallelism, which generate chattering.

In addition, when the pleats are compressed, the support region tends to deform in an excessive and uncontrolled fashion, forming a cup whose base comes into abutment against the progressivity web of the friction disk; this causes stiffening of the progressivity curve and prevents the stiffness specifications from being achieved.

FR 2 530 756 and DE 21 11 892 describe progressivity blades applied and riveted onto the external rim of a web, the lining support region of which has cutouts that allow said blades to be lighter and more flexible.

These cutouts nevertheless do not allow the deformation of the support regions to be controlled, and the profile and geometry of those regions are furthermore inappropriate for solving the out-of-parallelism problems of the linings.

SUMMARY OF THE INVENTION

The invention aims to overcome these technical problems by proposing an improved progressivity device having blades whose deformation is controlled by suppressing or at least by greatly limiting both the risk of out-of-parallelism of the linings during re-engagement phases, and the cupping effect of that deformation.

This object is achieved by means of a progressivity device for a clutch friction disk comprising a progressivity web having a central rotation axis, having on one face of its external rim a series of blades on which are configured at least two deformable pleats delimiting a region intended to support a first friction lining and equipped with a stiffness element, and on the other face a second friction lining, wherein said stiffness element comprises at least one tab projecting below said region, one end of which is intended to come into abutment against the web upon deformation of the pleats, limiting the arching of said region.

According to a first variant, the tab is delimited by a cutout.

According to a sub-variant, the cutout is H-shaped.

According to a second variant, the device comprises two identical tabs extending symmetrically with respect to the radial center axis of the support region.

According to a third variant, the tab is flanked by two longitudinal slots and extends tangentially to the web.

According to yet another variant, the tab is constituted by a boss extending orthoradially to the central axis of the web.

According to an advantageous characteristic, the tab extends at rest at an inclination of between 1° and 20° with respect to the plane of the support region.

The tab is preferably located between the two pleats.

According to another characteristic, the support region is equipped with four orifices that are intended to receive fastening rivets for the first lining and are positioned on either side of the tab.

Preferably the arching height of the tab is less than or equal to the arching height of the support region.

According to a particular variant, the blades are applied and riveted on the external rim of the web by means of at least one of their ends.

According to yet another characteristic, the pleats extend in an orthoradial direction with respect to the central axis of the web, so that under abutment stresses the pleats are compressed isostatically.

Preferably the pleats are parallel and have the same axial stiffness.

Advantageously, the pleats have the same width and the same height, and extend symmetrically on either side of the diametrical axis of the web.

According to another specific variant, the pleats are constituted by three segments inclined at an angle of between 1° and 20° with respect to the plane perpendicular to the central rotation axis of the web.

According to yet another variant, said support region is provided with a radial recess extending between the two pleats.

Advantageously, the blades are made of steel sheet and the pleats are perpendicular to the rolling direction of the sheet.

Another object of the invention is a clutch friction disk comprising a progressivity device as defined above.

Thanks to the isostatic arching of the blades and the presence of the tabs, the progressivity device according to the invention allows preservation of the linings and minimizes their geometric defects (out-of-parallelism), both in the free state and under stress during the re-engagement phase, which can thus be effected in a smooth, comfortable, and jerk-free manner with no chattering.

The progressivity and stiffness curve of the friction disk comprising the progressivity device according to the present invention is found to be very flexible at low load, and stiffens very progressively in response to large loads.

The invention furthermore allows better control of industrial manufacture of the friction disks, because the progressivity blades and their cutouts are created by machining or by being cut out on a stamping press independently of the central support web, thus reducing the risks of dimensional deviation, and because their pleats are all oriented identically with respect to the rolling direction of the steel sheet.

Other characteristics and advantages of the invention will become evident upon reading the description that follows, referring to the attached Figures and described in detail below.

BRIEF DESCRIPTION OF THE DRAWINGS

FIG. 4A is a partial exploded perspective view of another embodiment of a friction disk comprising a second variant of the progressivity device according to the invention, as depicted in perspective in FIG. 4B.

FIGS. 5A and 5B are respectively a frontal view and a section view along V-V of a blade used in the second variant embodiment of the device according to the invention of FIGS. 4A and 4B.

For greater clarity, identical or similar elements are labeled with identical reference characters in all the Figures.

DETAILED DESCRIPTION OF THE PREFERRED EMBODIMENT(S)

The embodiments illustrated in the Figures presented above are of course provided only as non-limiting examples. Provision is explicitly made that these different embodiments and variants can be combined with one another so as to propose others.

Figure 1A:
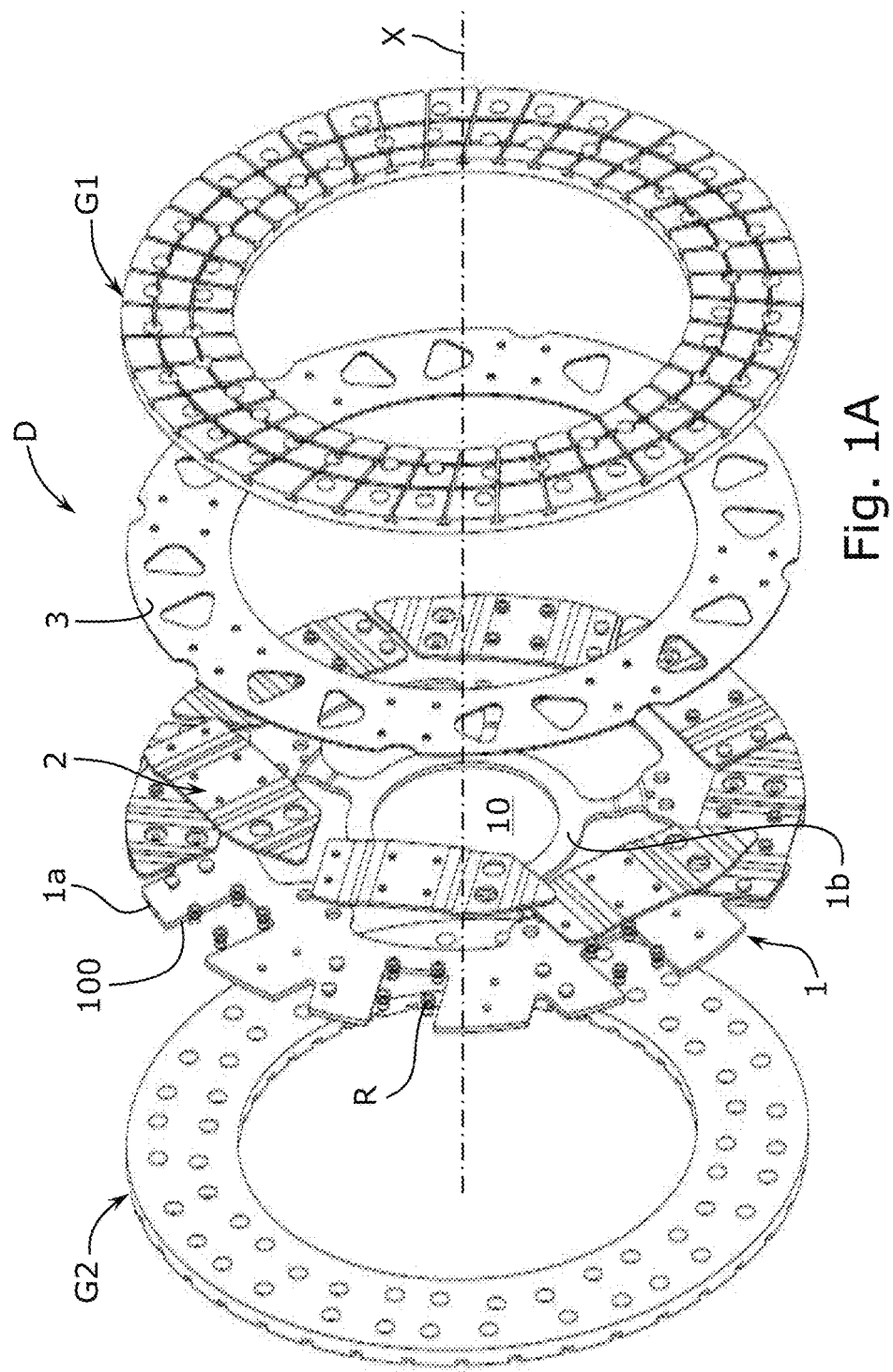
FIGS. 1A and 1B are overall perspective views of a first embodiment of a friction disk comprising the progressivity device according to the present invention, respectively as an exploded view and after assembly of the various components.
Figure 1B:
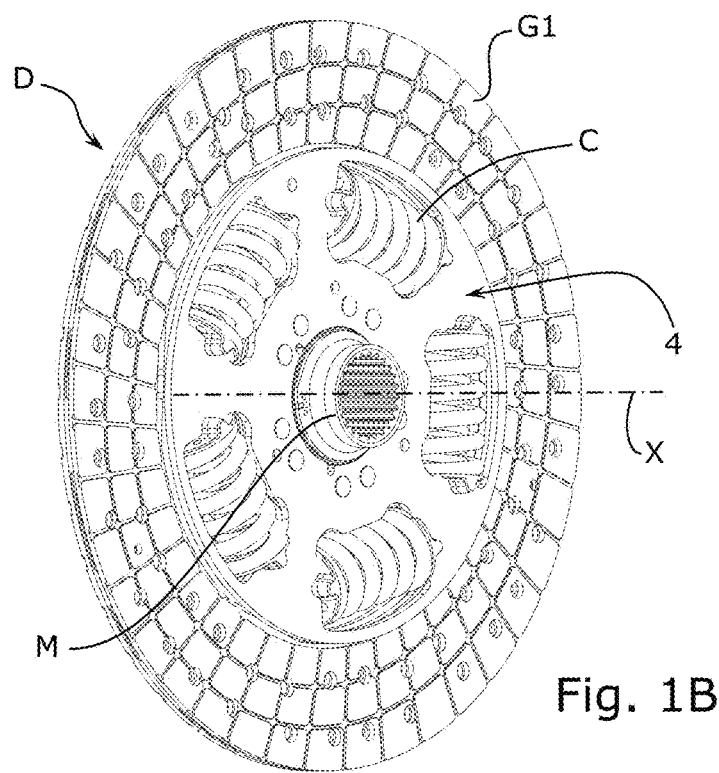

FIGS. 1A and 1B illustrate a first embodiment of an improved friction disk comprising the progressivity device according to the invention.

This friction disk D comprises, in traditional fashion, an annular progressivity web 1 with a central rotation axis X having an external rim 1a equipped with a series of applied blades 2 intended to support peripheral friction linings, and a central orifice 10 delimited by an internal rim 1b ensuring connection to a hub M (FIG. 1B).

Blades 2 are distributed angularly over the periphery of web 1, around rotation axis X.

A clutch mechanism fastened on the engine flywheel (not depicted) applies a clamping force onto friction disk D in order to transmit the torque produced by the engine.

The two friction linings are implemented in the form of applied rings G1, G2 that are fastened on either side of web 1, as illustrated in FIG. 1A.

Friction hub M is mounted on the driven shaft of the gearbox and is connected to web 1 by a set of peripheral teeth meshing into slots (not visible in the Figures) configured on internal rim 1b of central orifice 10.

First lining G1 comes into engagement with the pressure plate of the clutch mechanism (not depicted), while second lining G2 comes into abutment against the engine flywheel in the engaged position.

Two guide washers 4 arranged on either side of web 1 are mounted on the central hub, capturing compression springs C in intercalated receptacles (FIG. 1B).

In order to increase its stiffness and service life, first friction lining G1 here is adhesively bonded to an intercalated shim 3 that is in turn fastened onto one face of web 1, while second friction lining G2 is fastened directly onto the other face of web 1 by adhesive bonding, as illustrated in FIG. 1A.

Figure 1C:
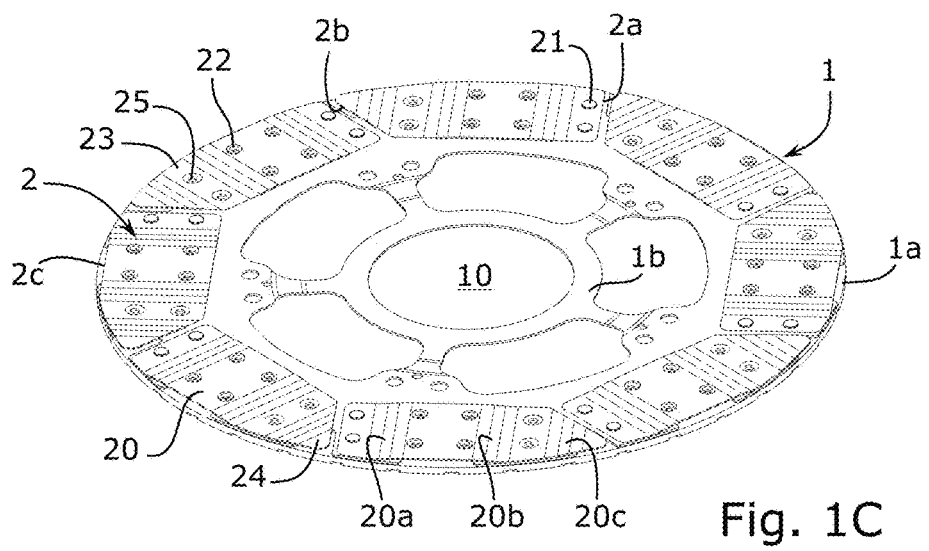
FIG. 1C is a perspective view of a first variant embodiment of the progressivity device according to the invention.

In the embodiment of FIGS. 1A and 1C, the blades 2 are integrated and fastened onto the external rim 1a of the progressivity web 1, at at least one of their ends, by means of rivets R. Configured on these blades are at least two pleats 20a, 20b of material delimiting a support region 20 of first friction lining G1. The support region 20 is defined between the two deformable pleats 20a, 20b, as illustrated in FIGS. 3A-3B and 6A-6B.

Once blades 2 have been riveted to web 1, support region 20 becomes elevated by an amount equal to the height of pleats 20a, 20b with respect to the plane of the web.

Support region 20 is preferably planar, and is equipped here with four orifices 22 intended to receive rivets R for fastening lining G1.

Blades 2 are substantially rectangular in shape, with one planar end 2a having a straight edge and one beveled end 2b, and are fastened on external rim 1a of web 1 at at least one of those ends and preferably at straight end 2a, as illustrated by FIGS. 1A and 1B.

For this purpose, blades 2 are equipped with at least one pair of aligned bores 21 that coincide with corresponding bores configured on rim 1a of web 1 in order to receive appropriate sets of rivets.

Blades 2 are equipped with at least one pair of aligned orifices 25 creating a space for reception of the rivets for fastening lining G2.

Figure 2B:
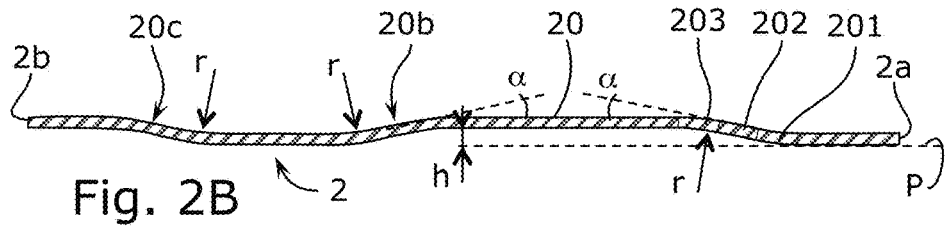
FIGS. 2A and 2B are respectively an enlarged frontal view and a section view along II-II of a blade used in the variant of the device according to the invention as illustrated by FIGS. 1A and 1C.
Figure 2A:
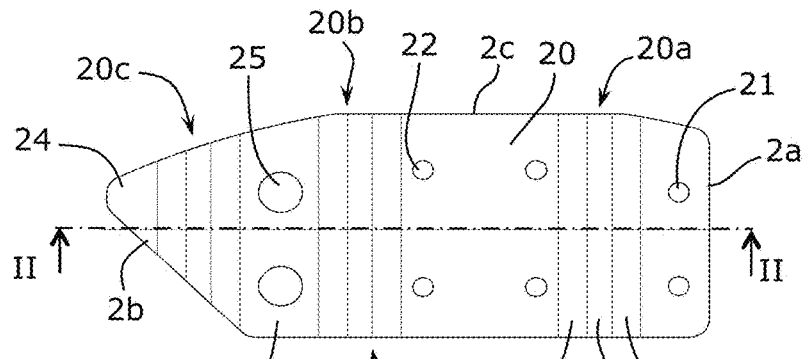
Figure 3A:
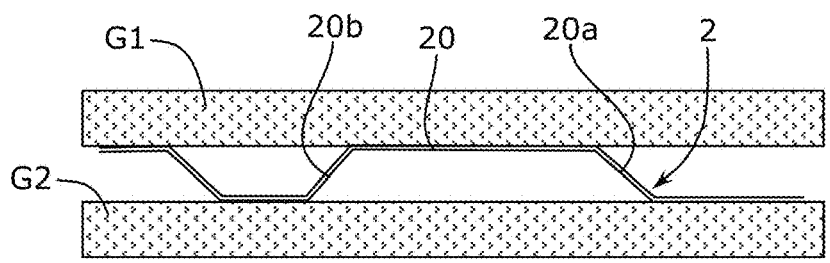
FIGS. 3A and 3B are schematic partial section views (without the rivets or web) of the progressivity device according to the invention, respectively at rest and in a re-engagement phase.
Figure 3B:
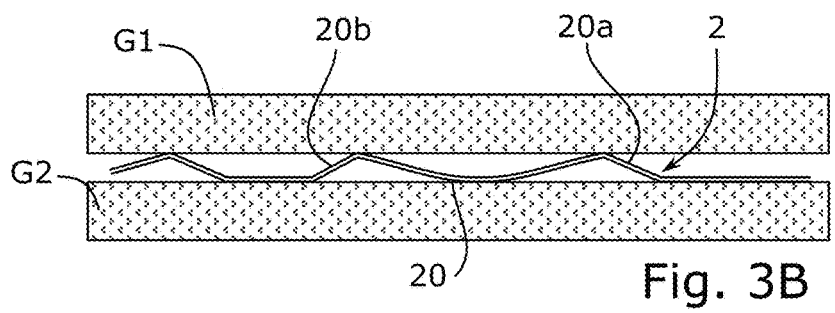

In the embodiment of FIG. 2B, beveled end 2b terminates in a spatula 24 that is left free in order to cover external rim 1a of web 1.

Blades 2 are mounted on external rim 1a of web 1 in such a way that the internal edge of beveled end 2b of each blade is arranged parallel with the edge of straight end 2a of the immediately contiguous blade, and so that external edge 2c of the rectangular portion of the blades adjoins the periphery of the web, as illustrated in FIG. 1C.

Planar end 2a, having a straight edge, of blades 2, which here is riveted to web 1, is adjacent to one of the two pleats 20a, 20b.

According to a first aspect of the invention, the two pleats 20a, 20b form arches that are identical in width, height, and therefore stiffness, which extend in directions that are both parallel to one another and orthoradial with respect to central rotation axis X of web 1 and thus of the friction disk.

The "orthoradial" direction can be defined as being orthogonal to rotation axis X and, in particular, perpendicular to the installation radius of blades 2 on web 1.

The pleats are constituted by three segments 201, 202, 203 inclined at an angle $\alpha$ of between 1° and 20° with respect to the perpendicular plane of central rotation axis X of the friction disk, as illustrated in FIG. 2B.

The inclination of these segments ensures an elevation h of between 0.5 and 1.5 mm of support region 20 with respect to plane P of web 1.

Figure 7B:
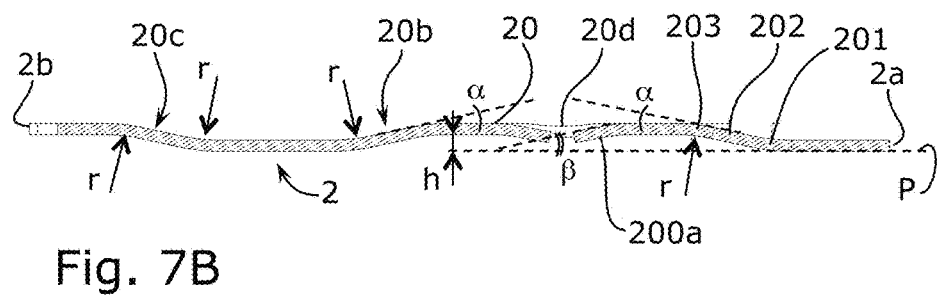
FIGS. 7A and 7B are respectively a frontal view and a section view along VII-VII of a blade used in a third variant embodiment of the device according to the invention.

This inclination results from a curvature of radius r, as illustrated by FIG. 2B and FIG. 7B.

After riveting of blades 2, these pleats are moreover positioned symmetrically on either side of the diametrical axis of web 1.

The supporting means of first lining G1 thus have a uniform stiffness over all blades 2, so as to deform isostatically and elastically.

More specifically, upon compression of blades 2, their displacement is limited to the orthoradial direction and some of their degrees of mobility are blocked, but each degree of freedom is blocked only once, so that no stress is exerted on the blades.

The geometry and the profile of the pleats are defined so that the mechanical stresses generated in the blades remain in the elastic range of their constituent material.

As a consequence, during the re-engagement phase when at least one of linings G1, G2 is subjected to abutment stresses, said stresses are transmitted to support region 20 and to pleats 20a, 20b, which then deform in controlled fashion.

More specifically, the two pleats compress in the same direction, identically and simultaneously over all the blades, in the manner of hinges, causing a tangential angular offset of the two linings whose friction faces nevertheless remain in parallel planes, as illustrated in FIGS. 3A and 3B, and 6A and 6B.

The pleats thus compress isostatically.

This selective deformation of pleats 20a, 20b of support region 20 allows first lining G1 to pivot freely around rotation axis X of the friction disk relative to second lining G2, with no loading or deformation of the friction faces.

Linings G1, G2 thus remain in a plane perpendicular to axis X.

According to a variant of the invention (illustrated in particular in FIGS. 7A and 7B), support region 20 comprises a shallow recess 20d, extending radially, halfway between the two pleats 20a, 20b and parallel to them.

This recess preferably extends radially from one edge of the blade to the other.

In the embodiments depicted in the Figures, blades 2 have a third pleat 20c, parallel to the other two pleats 20a, 20b and of the same width and height, that is located on beveled end 20b opposite the planar, straight edge 2a riveted to web 1.

This third pleat 20c is on the one hand separated from the other two pleats by a planar region 23 perforated by at least one, and in this case two, complementary bores 25 for fastening to web 1, and on the other hand is extended by spatula 24.

Spatula 24 rises to a height that is equal to height h of support region 20 and is thus preferably between 0.5 and 1.5 mm above the plane of web 1.

In the variant illustrated in FIGS. 1A and 4A, external rim 1a of web 1 has indentations 100 configured in the angular sectors located below pleats 20a, 20b of blades 2.

Indentations 100 make it possible both to reduce inertia and to configure an axial receptacle for the rivets for fastening first lining G1.

Web 1 and blades 2 are made of steel sheet, and pleats 20a, 20b, 20c are perpendicular to the rolling direction of the sheet, which allows the risk of dimensional deviations to be reduced.

In order to control the deformation of support region 20 during the re-engagement phase and to avoid the "cupping" effect (visible in FIG. 3B) which is prejudicial to comfort during the re-engagement phase, in a second aspect the invention makes provision to equip support region 20 with an additional stiffness element.

This additional stiffness element comprises at least one tab 200 that projects axially below the planar support region 20 toward the progressivity web 1 and is spaced from the deformable pleats 20a, 20b so as to be disposed between the two deformable pleats 20a, 20b.

Figure 6A:
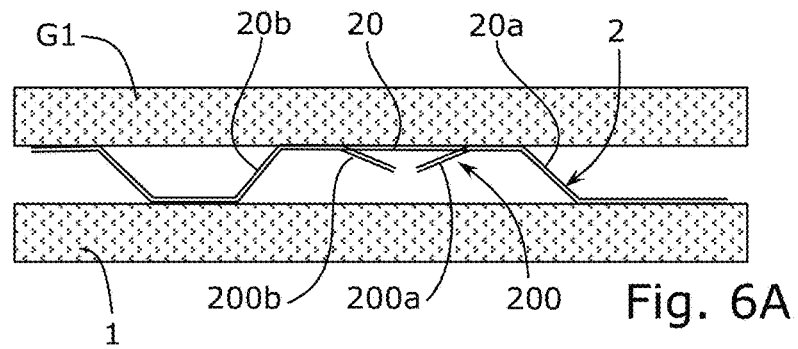
FIGS. 6A and 6B are schematic partial section views (without the rivets) of the second variant embodiment of the progressivity device according to the invention as illustrated by FIGS. 5A and 5B, respectively at rest and in a re-engagement phase.
Figure 6B:
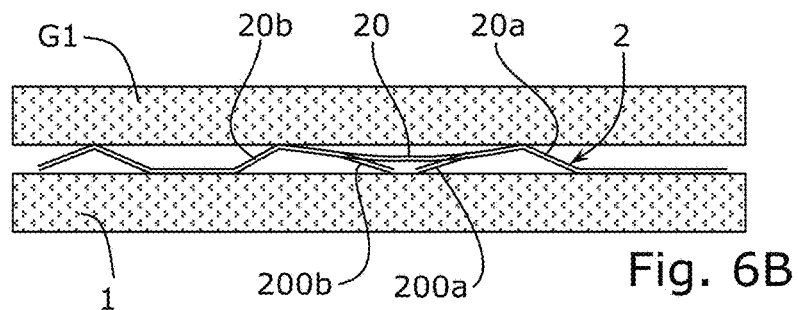

One of the ends of this tab is intended to come to a stop against the progressivity web 1 upon deformation of the deformable pleats 20a, 20b, limiting the collapse (i.e., arching or bending) of the planar support region 20, as illustrated in FIG. 6B.

In the variants illustrated in FIGS. 4A, 4B, 5A, 5B, and 6A, 6B, this stiffness element has in particular two facing tabs 200a, 200b that are delimited by a cutout configured through support region 20.

There is a single cutout here, in the shape of an H.

Preferably the two tabs 200a, 200b are identical and extend symmetrically with respect to the central axis of support region 20. In the position at rest of the clutch friction disk (i.e., in an uncompressed condition of the deformable pleats 20a, 20b of the blades 2), one of the ends of each of the tabs 200a, 200b is axially spaced from the progressivity web 1 as illustrated in FIG. 6A, while during the re-engagement phase of the clutch friction disk (i.e., in a compressed condition of the deformable pleats 20a, 20b of the blades 2) illustrated in FIG. 6B, one of the ends of each of the tabs 200a, 200b comes into abutment (i.e., to a stop) against the progressivity web 1 upon deformation of the deformable pleats 20a, 20b, thus limiting the arching (or bending) of the support region 20.

Figure 7A:
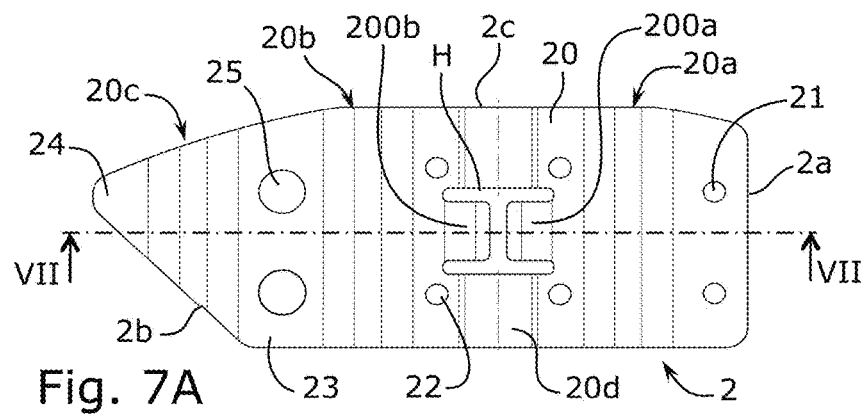

If support region 20 is also provided with a recess 20d as illustrated in FIG. 7A, that recess is interrupted by the H-shaped cutout and is then in two parts located respectively on either side of tabs 200a, 200b.

According to another variant that is not depicted, the support region is provided with two longitudinal slots that border and enclose a single, cradle-shaped tab.

Preferably these slots are parallel and extend tangentially to web 1.

According to another variant that is also not depicted, the tab is constituted by a boss that is produced, for example, by stamping and extends orthoradially to central axis X of web 1.

As illustrated in FIG. 7B, tabs 200a, 200b extend at rest with an inclination β of between 1° and 20° with respect to the plane of support region 20 or plane P of web 1, and are located between the two pleats 20a, 20b.

The four orifices 22 intended to receive rivets R for fastening the first lining are positioned here on either side of the H-shaped cutout.

As illustrated schematically in FIG. 6B, a bending height of the tabs 200a, 200b is substantially equal to half a bending height of the support region 20.

Figure 8:
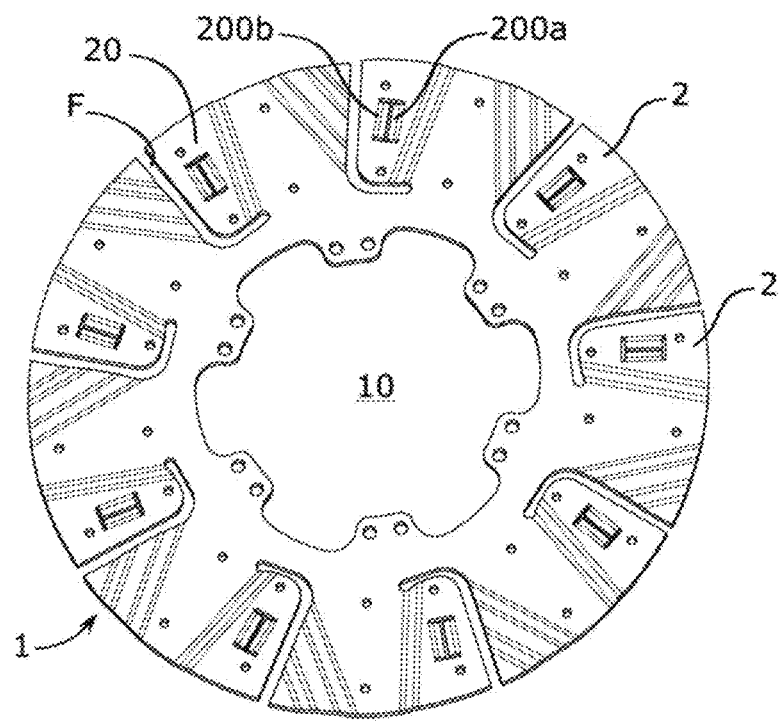
FIG. 8 is a perspective view of a fourth variant of the progressivity device according to the invention.

The variant depicted in FIG. 8 of the progressivity device according to the invention corresponds to a one-piece assemblage of web 1 and blades 2.

Here blades 2 are shaped directly into external rim 1a of web 1 and are separated from one another by L-shaped slots F opening toward the edge of the web.

In this variant, the pleats do not necessarily all extend in the orthoradial direction.

As previously, region 20 intended for supporting the linings has an additional stiffness element in the form of tabs 200a, 200b.

Figure 9:
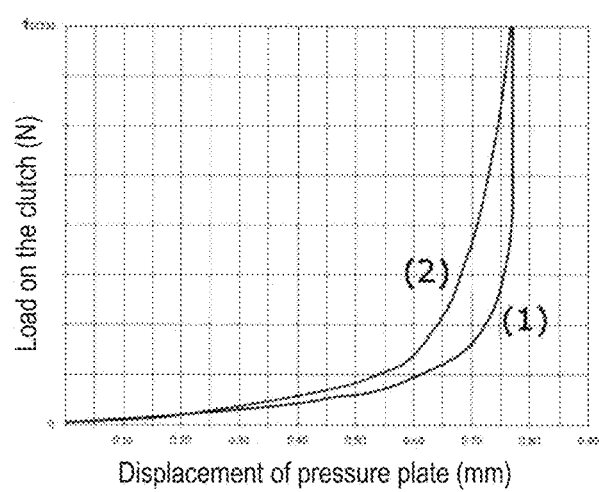
FIG. 9 is a graph comparing the displacements of linings under stress, with blades respectively according to the first variant of the device according to the invention (FIGS. 2A, 2B—curve 1) and according to the second variant in which said blades are equipped with an additional stiffness element (FIGS. 7A, 7B—curve 2).

The graph of FIG. 9 presents two curves illustrating the mechanical behavior of a clutch comprising the blades of the progressivity device according to the invention, respectively according to the variant having no additional stiffness element (curve 1) and the variant having said stiffness element (curve 2).

The invention claimed is:

1. A progressivity device for a clutch friction disk, comprising:
   a progressivity web (1) including an external rim (1a) and having a central rotation axis (X);
   a series of blades (2) attached to one of axially opposite faces of the progressivity web (1);
   a first friction lining (G1) fastened to the blades (2); and
   a second friction lining (G2) fastened to another of the axially opposite faces of the progressivity web (1);
   each of the blades (2) having at least two deformable pleats (20a, 20b) delimiting a support region (20) between the at least two deformable pleats (20a, 20b), the support region (20) of each of the blades (2) being planar in an uncompressed condition of the at least two deformable pleats (20a, 20b) and configured to support the first friction lining (G1);
   the support region (20) has a stiffness element comprising at least one tab (200) projecting axially below the support region (20) toward the progressivity web (1) and spaced from the at least two deformable pleats (20a, 20b) so as to be disposed between the at least two deformable pleats (20a, 20b), one end of the at least one tab (200) configured to come into abutment against the progressivity web (1) upon deformation of the deformable pleats (20a, 20b) for limiting a bending of the support region (20).

2. The progressivity device according to claim 1, wherein the at least one tab (200) is delimited by a cutout.

3. The progressivity device according to claim 2, wherein the cutout is H-shaped.

4. The progressivity device according to claim 2, wherein the at least one tab (200) extends in the uncompressed condition of the at least two deformable pleats (20a, 20b) at an inclination (β) of between 1° and 20° with respect to a plane of the support region (20).

5. The progressivity device according to claim 3, wherein the at least one tab (200) comprises two identical tabs (200a, 200b) extending symmetrically with respect to the radial center axis of the support region (20).

6. The progressivity device according to claim 3, wherein the at least one tab (200) extends in the uncompressed condition of the at least two deformable pleats (20a, 20b) at an inclination (β) of between 1° and 20° with respect to a plane of the support region (20).

7. The progressivity device according to claim 5, wherein the at least one tab (200) extends in the uncompressed condition of the at least two deformable pleats (20a, 20b) at an inclination (β) of between 1° and 20° with respect to a plane of the support region (20).

8. The progressivity device according to claim 1, wherein the at least one tab (200) is flanked by two longitudinal slots and extends tangentially to the progressivity web (1).

9. The progressivity device according to claim 8, wherein the at least one tab (200) extends in the uncompressed condition of the at least two deformable pleats (20a, 20b) at an inclination (β) of between 1° and 20° with respect to a plane of the support region (20).

10. The progressivity device according to claim 1, wherein the at least one tab (200) extends in the uncompressed condition of the at least two deformable pleats (20a, 20b) at an inclination (13) of between 1° and 20° with respect to a plane of the support region (20).

11. The progressivity device according to claim 1, wherein the at least one tab (200) is located between the two deformable pleats (20a, 20b).

12. The progressivity device according to claim 1, wherein a bending height of the at least one tab (200) is less than or equal to half of a bending height of the support region (20).

13. The progressivity device according to claim 1, wherein each of the blades (2) is applied and riveted on the external rim (1a) of the progressivity web at one of ends (2a) of each of the blades (2).

14. The progressivity device according to claim 1, wherein the deformable pleats (20a, 20b) extend in an orthoradial direction with respect to the central axis (X) of the progressivity web, so that under abutment stresses the deformable pleats are compressed isostatically.

15. The progressivity device according to claim 1, wherein the deformable pleats (20a, 20b) are parallel and have the same axial stiffness.

16. The progressivity device according to claim 1, wherein the deformable pleats (20a, 20b) have the same width and the same height (h), and extend symmetrically on either side of a diametrical axis of the progressivity web (1).

17. The progressivity device according to claim 1, wherein the deformable pleats (20a, 20b) are constituted by three segments (201, 202, 203) inclined at an angle (a) of between 1° and 20° with respect to a plane perpendicular to the central rotation axis (X) of the progressivity web (1).

18. The progressivity device according to claim 1, wherein the support region (20) is provided with a radial recess (20d) extending between the two deformable pleats (20a, 20b).

19. A clutch friction disk (D), comprising the progressivity device according to claim 1.

20. A progressivity device for a clutch friction disk, comprising:
- a progressivity web (1) including an external rim (1a) and having a central rotation axis (X);
- a series of blades (2) attached to one of axially opposite faces of the progressivity web (1);
- a first friction lining (G1) fastened to the blades (2); and
- a second friction lining (G2) fastened to another of the axially opposite faces of the progressivity web (1);
- each of the blades (2) having at least two deformable pleats (20a, 20b) delimiting a support region (20) between the at least two deformable pleats (20a, 20b), the support region (20) configured to support the first friction lining (G1);
- the support region (20) provided with a stiffness element comprising at least one tab (200) projecting axially below the support region (20) toward the progressivity web (1) and spaced from the at least two deformable pleats (20a, 20b) so as to be disposed between the at least two deformable pleats (20a, 20b), one end of the at least one tab (200) configured to come into abutment against the progressivity web (1) upon deformation of the deformable pleats (20a, 20b) for limiting a bending of the support region (20);
- the external rim (1a) of the progressivity web (1) comprising indentations (100) configured in the form of angular sectors located below the deformable pleats (20a, 20b) of the blades (2).

21. A progressivity device for a clutch friction disk, comprising:
- a progressivity web (1) including an external rim (1a) and having a central rotation axis (X);
- a series of blades (2) attached to one of axially opposite faces of the progressivity web (1);
- a first friction lining (G1) fastened to the blades (2); and
- a second friction lining (G2) fastened to another of the axially opposite faces of the progressivity web (1);
- each of the blades (2) having at least two deformable pleats (20a, 20b) delimiting a support region (20) between the at least two deformable pleats (20a, 20b), the support region (20) configured to support the first friction lining (G1);
- the support region (20) provided with a stiffness element comprising at least one tab (200) projecting axially below the support region (20) toward the progressivity web (1) and spaced from the at least two deformable pleats (20a, 20b) so as to be disposed between the at least two deformable pleats (20a, 20b), one end of the at least one tab (200) configured to come into abutment against the progressivity web (1) upon deformation of the deformable pleats (20a, 20b) for limiting a bending of the support region (20);
- the at least one tab (200) delimited by an H-shaped cutout;
- the support region (20) provided with a recess (20d) extending between the two deformable pleats (20a, 20b);
- the recess (20d) interrupted by the H-shaped cutout so that the recess (20d) comprises two parts located on radially opposite sides of the H-shaped cutout.

* * * * *